United States Patent [19]
DeCook

[11] Patent Number: 5,956,129
[45] Date of Patent: *Sep. 21, 1999

[54] WRITING PRINT CHARACTERISTICS TO MAGNETICS-ON-FILM

[75] Inventor: Bradley Charles DeCook, Rochester, N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/653,950

[22] Filed: May 22, 1996

[51] Int. Cl.⁶ .................................................. G03B 27/52
[52] U.S. Cl. ............................................ 355/40; 396/562
[58] Field of Search ................................ 355/40, 41, 50; 396/562, 555, 558

[56] References Cited

U.S. PATENT DOCUMENTS

| | | |
|---|---|---|
| 5,025,283 | 6/1991 | Robison . |
| 5,029,313 | 7/1991 | Robison et al. ........................ 355/40 |
| 5,229,810 | 7/1993 | Cloutier et al. . |
| 5,231,451 | 7/1993 | Uekusa et al. . |
| 5,253,011 | 10/1993 | Zahn et al. . |
| 5,347,403 | 9/1994 | Uekusa . |
| 5,612,796 | 3/1997 | DeCook et al. ........................ 358/527 |
| 5,696,576 | 12/1997 | Itoh et al. ................................ 355/40 |
| 5,710,618 | 1/1998 | McIntyre .................................. 355/40 |

FOREIGN PATENT DOCUMENTS

| | | |
|---|---|---|
| 0 675 395 | 10/1995 | European Pat. Off. . |
| 0 677 770 | 10/1995 | European Pat. Off. . |
| 0 727 694 | 8/1996 | European Pat. Off. . |

*Primary Examiner*—Safet Metjahic
*Assistant Examiner*—John Chizmar
*Attorney, Agent, or Firm*—Frank Pincelli

[57] ABSTRACT

A high speed photofinishing apparatus for reading information/data from a photosensitive filmstrip and for writing data on a magnetic layer contained on the filmstrip. The apparatus comprises at least one device for reading information/data from the filmstrip and a magnetic write head for writing information/data on the magnetic layer at a predetermined location. The write head is positioned with respect to the at least one device for reading a distance sufficient for allowing sufficient computational time needed for processing the information/data so that it can be magnetically written on the magnetic layer at the predetermined location.

23 Claims, 3 Drawing Sheets

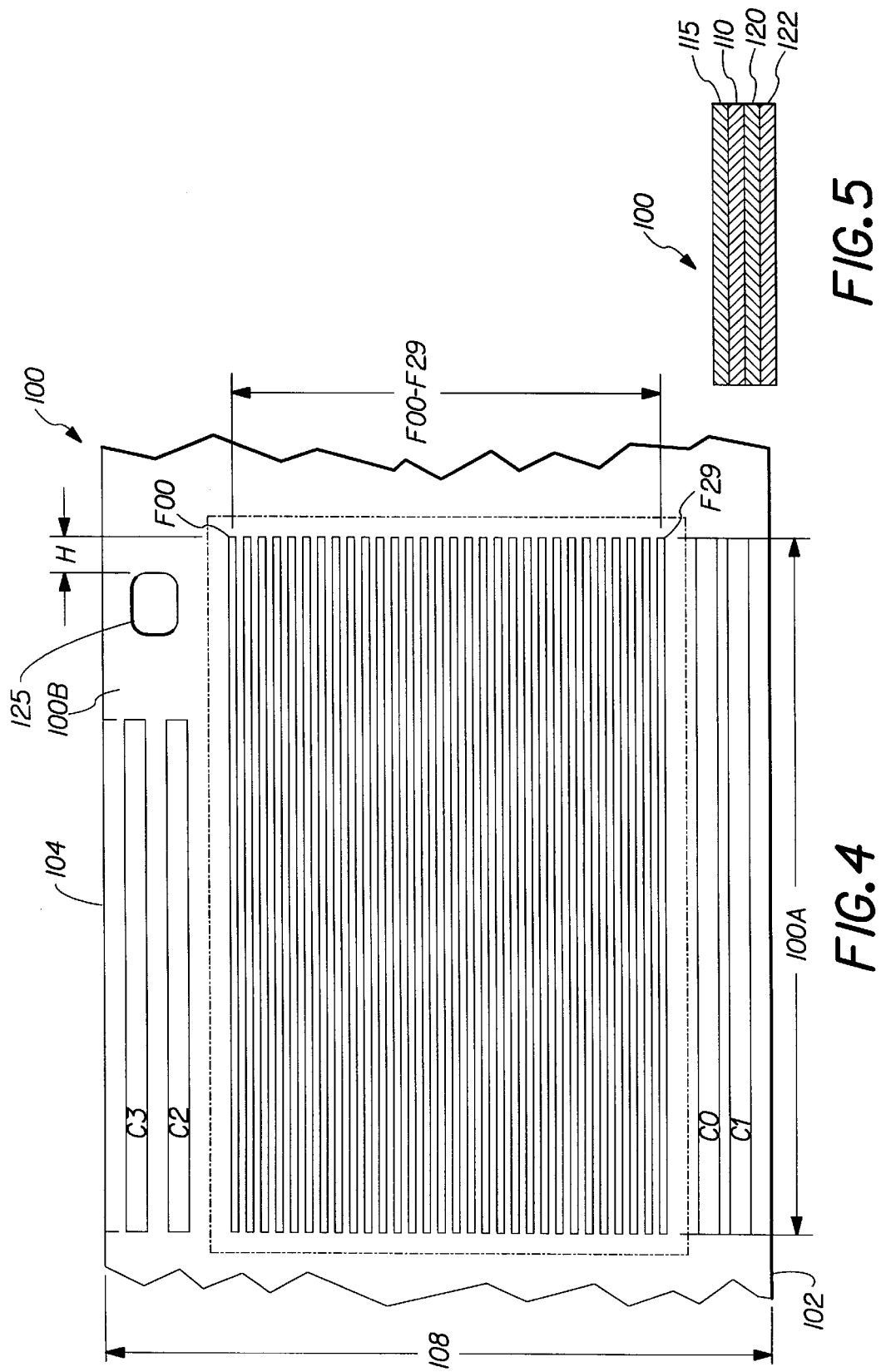

WRITING PRINT CHARACTERISTICS TO MAGNETICS-ON-FILM

FIELD OF THE INVENTION

This invention relates to photofinishing and, more particularly, to an apparatus for supplying a high speed photofinishing system with film imaging computational data and film encoded data obtained from photographic film formats, including magnetically encoded information and optically encoded information, as well as imaging information.

BACKGROUND OF THE INVENTION

It is known in the art of commercial photographic processing to maintain very high rates of processing in order to operate profitably. Recent developments in photographic systems include the combination of silver halide and magnetic technologies. New film formats have a magnetic strip containing magnetic information that must be processed on compatible equipment. U.S. Pat. No. 5,229,810 illustrates a photographic sensitive film coated with an optically transparent magnetic layer whereby information can be magnetically written or read therefrom. These new type films also include additional optical information such as bar coded film ID numbers and claim numbers, and print aspect ratio and cartridge hand of load, known as "fat" bits. New and conventional photographic processing equipment must be able to read and interpret this information so that photographic, as well as index prints, can be generated. An example of a photofinishing apparatus capable of reading such information is disclosed in pending U.S. Ser. No. 08/394,533, filed Feb. 17, 1995, entitled FILM PREPARATION WORKSTATION, by Bradley C. DeCook and Thomas J. Murray. This application is hereby incorporated by reference into this application in its entirety. The film preparation workstation is designed to receive film for reading data therefrom and/or writing various data thereon and taking the data and supplying it to additional photofinishing devices, either by floppy disk or via Internet connection. It is also desirable to write information that has been read directly on the film. However, a problem with prior art devices is that there is required computational time from the moment information is read so that it can be translated to a format whereby allowing the data to be written on the magnetic layer present on the film. It is also desirable that this information be placed at a particular location on this film and accomplished at a high rate of speed.

Applicants have invented an improved system whereby information that has been read can be written onto the film in a precise, controlled, and synchronized manner by utilizing an event tracking system.

Writing the information directly on the film avoids or minimize the necessity of having floppy disks or Internet connection. Additionally, the information once printed on the film will always be available with the image thereon, thereby avoiding the need to have banks of memory in order to obtain all of the information scanned from the film.

BRIEF DESCRIPTION OF THE DRAWINGS

FIG. 4 is plan view of a portion of a filmstrip for use in the apparatus of FIG. 1; and FIG. 5 is a cross-sectional view of the filmstrip of FIG. 4.

SUMMARY OF THE INVENTION

A high speed photofinishing apparatus for reading information/data from a photosensitive filmstrip and for writing data on a magnetic layer contained on the filmstrip. The apparatus comprises at least one device for reading information/data from the filmstrip and a magnetic write head for writing information/data on the magnetic layer at a predetermined location. The write head is positioned with respect to the at least one device for reading a distance sufficient for allowing sufficient computational time needed for processing the information/data so that it can be magnetically written on the magnetic layer at the predetermined location.

DETAILED DESCRIPTION OF THE INVENTION

Figure 1:
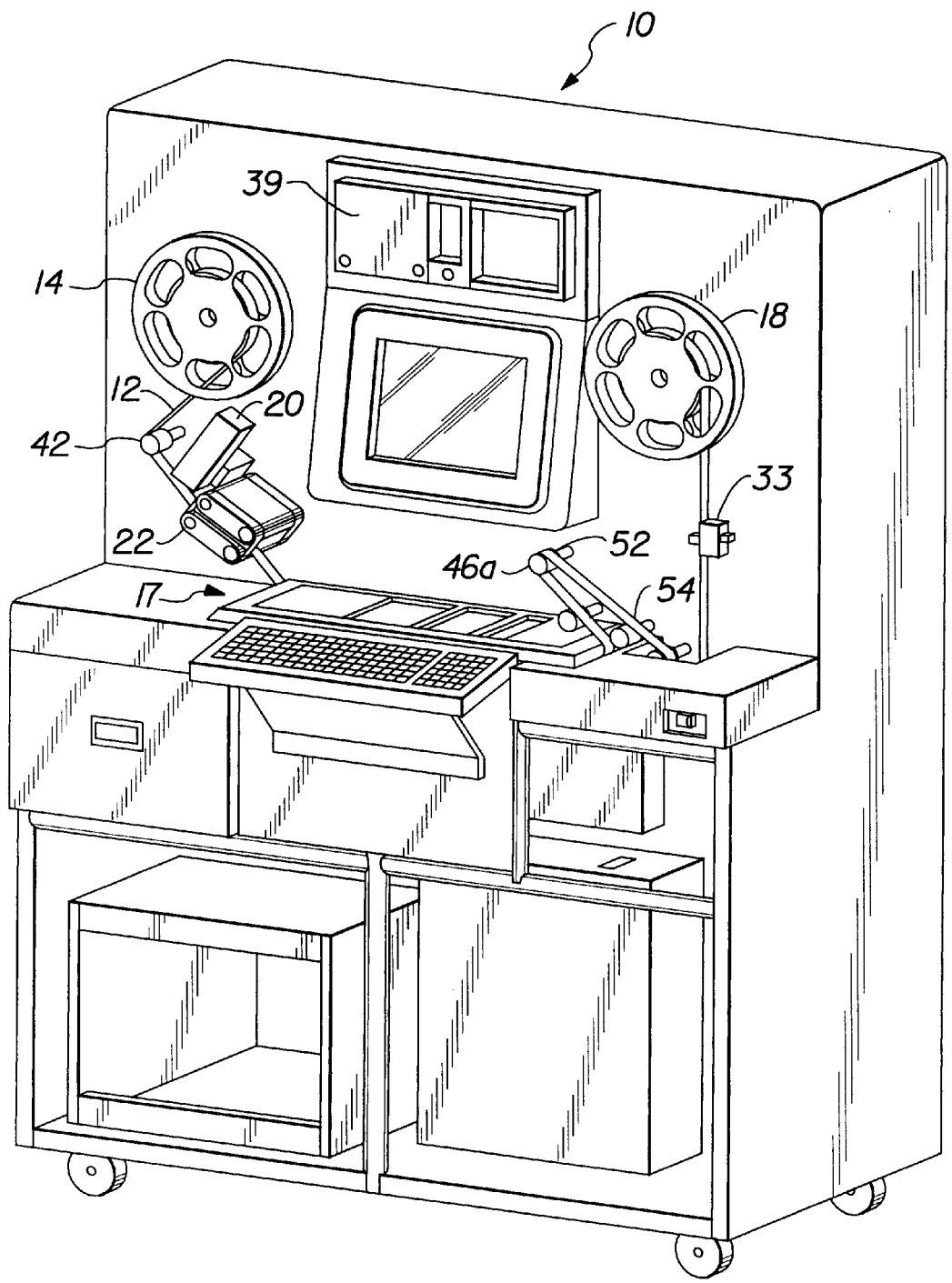
FIG. 1 is a perspective view of an apparatus made in accordance with the present invention.
Figure 2:
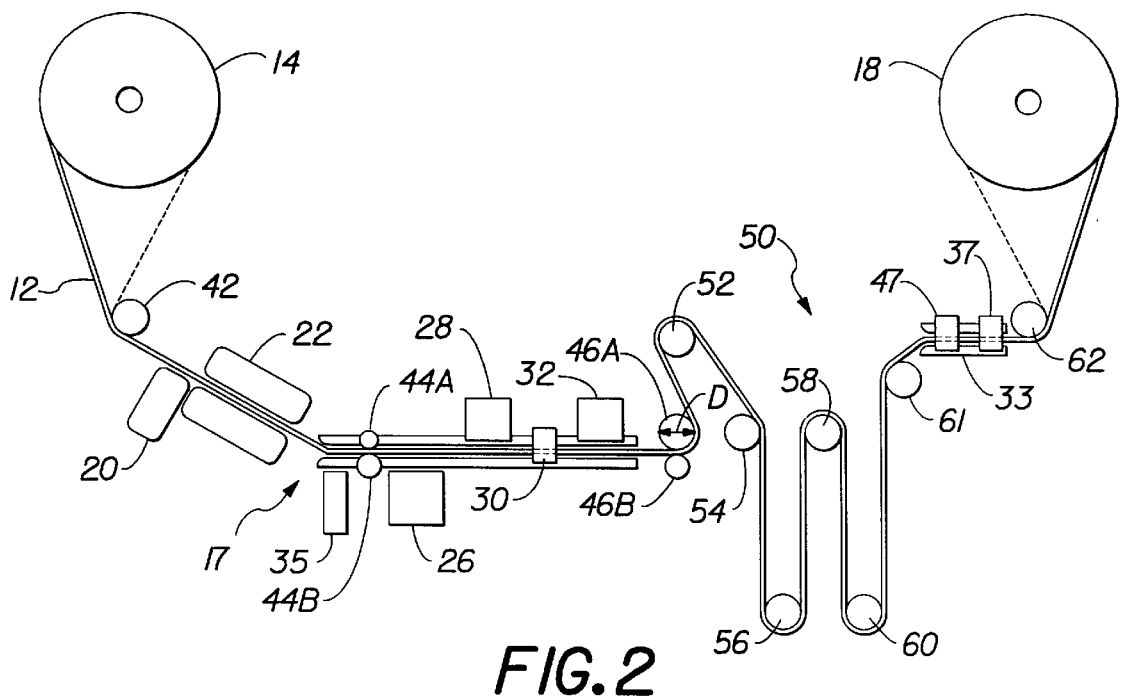
FIG. 2 is an enlarged, partially schematic view of the film handling system of the device of FIG. 1.
Figure 3:
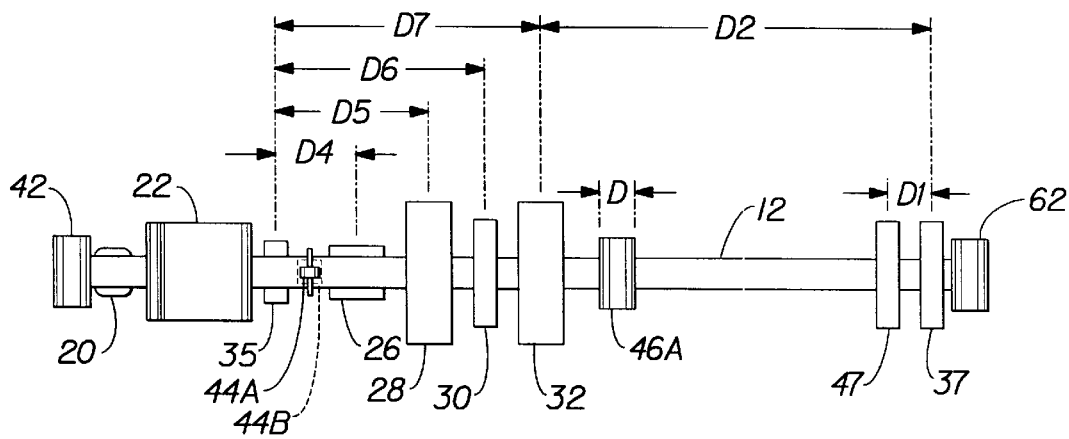
FIG. 3 is a top view of the schematic of FIG. 2 illustrating the dimensional positional relationship of the various components on the apparatus.

Referring to FIGS. 1, 2, and 3, there is illustrated a photographic film preparation workstation 10 for obtaining magnetically encoded film data, optically encoded film data, and film image scanning computational data for use by a high speed photographic printer (not shown) or other photofinishing devices. The workstation 10 also provides color corrected and formatted RGD data for use by the printer. It will also become apparent that the data obtained by the workstation 10 can be supplied to service printers, optical/digital index printers, photo CD writers, and additional downstream devices found inside and outside the photofinishing lab. In addition to the foregoing, the film preparation workstation has means for magnetically recording data onto the thin magnetic layer on the filmstrip.

A further detailed description of the film preparation workstation can be found in pending U.S. Ser. No. 08/394,533, previously discussed.

The film preparation workstation 10 is designed to receive film for reading data therefrom and writing various data thereon. A web of photosensitive material comprising a plurality of individual filmstrips spliced together is provided on a supply reel 14 and routed through the film preparation workstation by film track 17 and is wound back onto a take-up reel 18. Film track 17 includes a staple detection device 20, a film cleaning device 22, a spliced bar code reader 26, a film code reader 28, a magnetic reader 30, and a film scanner 32. A magnetic writer 33 is provided for writing information magnetically on the filmstrips which forms the web 12. A first perf detection device 35 is provided for detecting perforations that have been previously provided on the filmstrip at predetermined locations. The writer 33 includes a magnetic write head 37 which is used to write the data onto the magnetic layer on the filmstrip. The writer 33 also includes a second perf detection device 47 which is spaced a predetermined distance D1 from the write head 37 so that the write head will write the data at the desired location on the filmstrip. Appropriate means are provided for moving and driving the web through the film track 17. In the particular embodiment illustrated, a first guide roller 42 is provided for guiding the web 12 from the supply reel 14 past the staple detection device 20 to the film cleaning device 22. A second pair of rollers 44A and 44B are provided for threading web 12 past bar code reader 26, film code reader 28, magnetic reader 30, and scanner 32.

There is also provided a pair of drive rollers 46A,46B wherein 46A is a drive metering roller having a precise outer diameter D which is used in locating the position of the web with regard to the various components. Appropriate means for driving the filmstrip through the device is provided as is typically found in such devices. Preferably, the filmstrip is passed through the device at a relatively high rate of speed. In the embodiment illustrated, the filmstrip travels at a velocity in the range of 5–20 in/sec. Thereafter, the transport system includes a take-up mechanism 50, which comprises primarily of rollers 52,54,56,58,60,61,62, which thereby allows a predetermined length of the web to be temporarily stored so as to allow sufficient time for the CPU 39 to be able to take the information obtained from any of the various devices 26,28,30,32 and translate the data obtained into a magnetically readable form such that the write head 37 can place the data on the film at the desired location on the film. In the embodiment illustrated, data that is written onto the film by head 37 is placed adjacent to the area in which the information relates. Referring to FIGS. 4 and 5, there is illustrated a photographic filmstrip with a magnetic film layer and dedicated recording tracks which can be employed in the practice of an invention. The filmstrip is described in detail in commonly assigned U.S. Pat. No. 5,229,810, for example, and incorporated herein by reference, having an optically transparent MOF layer continuously coded on the non-emulsion side of the filmstrip base. The filmstrip 100 of the type described in the '810 patent having a base 110 with a photographic emulsion layer 115 on one side and a virtually transparent magnetic film (MOF) layer on the non-emulsion side. A lubricating layer 122 covers the MOF layer 120, and perforations 125 are provided for metering image frame areas through a camera exposure gate. Each image frame area of the filmstrip 100 includes a set of edge strip regions of the MOF layer 120, e.g., regions 100A, 100B, including recording/reproducing track pairs C0,C1, C2,C3 adjacent to respective filmstrip edges 102,104. The central image frame region of the MOF layer 120 includes tracks F00–F29 extending the image frame length 100A. The filmstrip 100 has a predetermined nominal width 108 for the filmstrip type, and track C0–C3 and F00–F29 have defined widths.

As described in greater detail in the '810 patent, the edge tracks C0–C3 are intended for use in recording exposure related information and the camera having edge mounted magnetic recording heads. Certain of the tracks F00–F29 contain filmstrip type information pre-recorded by the filmstrip manufacturer, and other of the tracks F00–F29 are reserved for recording information during photofinishing. In the variation of the filmstrip 100, recording and reproducing in the tracks F00–F29 is not practiced, and the MOF layer 120 may or may not be recorded over the image frame area. In this variation, one or more of the tracks C0–C3 in the edge regions 100A,100B are used for recording print related information, e.g., the color correction exposure data applied in the most recent set of prints made from the image frames. In such photofinishing equipment certain of the tracks are read out prior to printing to control printing operations, and the print related information is recorded in the recording tracks contemporaneously with the print exposure.

In referring back to FIG. 3, it can be seen that the various devices are spaced a particular distance with respect to each other and with respect to the write head 37. In particular, it can be seen that the film scanner 32 is positioned a distance D2 from the head 37 and, likewise, the splice bar code reader 26, film code reader 28, magnetic reader 30, and film scanner 32 are disposed a predetermined distance D3,D4,D5,D6,D7, respectively, with respect to perf detector 35 used to detect perforations that are provided periodically on the filmstrip.

The metering roller 46A allows the precise positioning of image frames located on the film with respect to any of the devices. All of the information received from the various devices are passed to a central processing unit (CPU), not shown, which allows the CPU to keep track of the various information that has been read by the various devices with respect to the image that was scanned to obtain the information. The magnetic head 37 is used to record data magnetically onto the magnetic layer provided on the filmstrip. The second perf detection device 47 is positioned a small distance D1 from the magnetic head in order to more accurately allow writing of the information at the appropriate location. Preferably, the second perf detection is disposed closely adjacent the write head 37, typically within about a couple inches.

In order to more clearly understand the present invention, a brief description of the operation of the device 10 will now be discussed. Initially, film that has been loaded onto reel 14 is passed through the film track 17 whereby the various devices scan the film web as it passes that point. The information so scanned is sent to the CPU 39 which appropriately transforms the information to magnetically encoded data for writing onto the web by head 37. The take-up mechanism 50 provides a sufficient lag time between any of the reading devices to that of the write head 37, thereby allowing the CPU to take full advantage of the computational time necessary to convert the information scanned to the appropriate format for writing magnetically onto the film. Since the particular relationship of all of the devices are known and the speed and velocity of the film are also known, the write head 37 can precisely write the data on the film as it passes.

The present invention provides a highly accurate system for keeping track of information that has been scanned, thus, that information can be magnetically written to very small or specific location with respect to the web and, more particularly, with respect to the image (frame) which provides the data. It should be understood that any various type of data may be scanned and placed onto the film as desired by the photofinisher. The various read devices discussed herein are only examples of the type of information that may be provided. Additionally, instructions can be magnetically written on the film designating the particular function to be performed by another photofinishing device such as a printer. For example, back printing information data, print title, frame number, FID number, etc., can be placed on the print. Image information, such as the light conditions taking a flash on, flash off, can also be provided. Any other information relating to the data can also be written thereon including image data information. Thus, the chances of losing information or putting the wrong information on the print is greatly minimized.

It is to be understood that various other changes and modifications can be made without the departing from and the scope of the present invention. The present invention is limited by the claims that follow.

Parts List:
10 . . . workstation
12 . . . web
14 . . . supply reel
17 . . . film track
18 . . . take-up reel
20 . . . staple detection device
22 . . . film cleaning device
26 . . . bar code reader
28 . . . film code reader
30 . . . magnetic reader 32 . . . film scanner
33 . . . magnetic writer
35,47 . . . perf detection device
37 . . . magnetic write head
39 . . . CPU
42 . . . first guide roller
44A,44B . . . pair of rollers
46A,46B . . . drive rollers
50 . . . take-up mechanism
52,54,56,58,60,61,62 . . . rollers
100 . . . filmstrip
100A,100B . . . regions
102,104 . . . filmstrip edges
108 . . . predetermined nominal width
110 . . . base
115 . . . emulsion layer
120 . . . MOF layer
122 . . . lubricating layer
125 . . . perforations

I claim:

1. A high speed photofinishing apparatus for reading information/data from a photosensitive filmstrip and for writing data on a magnetic layer contained on said filmstrip, said apparatus comprising:

transport means for continuously moving the filmstrip through the device in a single direction;

means for reading information/data from said filmstrip;

means for writing information/data on said magnetic layer at a predetermined location with respect to said means for reading information/data from said filmstrip; and means for allowing computational time needed for calculating said information/data so that it can be magnetically written on said magnetic layer on said filmstrip at said predetermined location such that said information/data is recorded adjacent the area on said filmstrip which said information/data relates.

2. An apparatus according to claim 1, wherein said means for reading information/data from said filmstrip comprises any one of the following:

an image scanner,
film code reader,
bar code reader,
magnetic reader.

3. An apparatus according to claim 1, wherein said filmstrip moves through said apparatus at a velocity in the range of 5–20 in/sec.

4. An apparatus according to claim 1, wherein said means for allowing computational time comprises positioning said means for writing at a location spaced from said means for reading information/data from said filmstrip.

5. An apparatus according to claim 1, further comprising metering means for monitoring the velocity of said filmstrip such that said means for writing will place said information/data at said predetermined location.

6. An apparatus according to claim 1, wherein said filmstrip moves through said apparatus at a velocity equal to or greater than about 5 in/sec.

7. An apparatus according to claim 1 wherein said means for reading information are positioned at predetermined distances with respect to a first reference device.

8. An apparatus according to claim 7 wherein said first reference device monitors a feature that is periodically provided on the filmstrip.

9. An apparatus according to claim 8 wherein said first reference device is a perf detection device which detects perforations provided on the filmstrip.

10. An apparatus according to claim 7 wherein a second reference device is provided at a second predetermined distance with respect to said means for writing, said second reference device is disposed closely adjacent the means for writing.

11. A high speed photofinishing apparatus for reading information/data from a photosensitive filmstrip and for writing data on a magnetic layer contained on said filmstrip, said apparatus comprising:

transport mechanism for continuously moving the filmstrip through the apparatus in a single direction;

at least one device for reading information/data from said filmstrip;

a magnetic write head for writing information/data on said magnetic layer at a predetermined location with respect to said at least one device for reading information/data from said filmstrip; and said write head being positioned with respect to said at least one device for reading a distance sufficient for allowing sufficient computational time needed for processing said information/data so that it can be magnetically written on said magnetic layer at said predetermined location such that said information/data is recorded adjacent the area and said filmstrip which said information/data relates.

12. An apparatus according to claim 11, wherein said at least one device for reading information/data from said filmstrip comprises any one of the following:

an image scanner,
film code reader,
bar code reader,
magnetic reader.

13. An apparatus according to claim 11, wherein said filmstrip moves through said apparatus at a velocity in the range of 5–20 in/sec.

14. An apparatus according to claim 11, wherein said means for allowing computational time comprises positioning said magnetic write head at a location spaced from said at least one device for reading information/data from said filmstrip.

15. An apparatus according to claim 11, further comprising a metering device for monitoring the velocity of said filmstrip such that said magnetic write head for writing will place said information/data at said predetermined location.

16. An apparatus according to claim 11, wherein said filmstrip moves through said apparatus at a velocity equal to or greater than about 5 in/sec.

17. An apparatus according to claim 11, wherein said at least one device for reading information is positioned at predetermined distance with respect to a first reference device.

18. An apparatus according to claim 17, wherein said first reference device monitors a feature that is periodically provided on the filmstrip.

19. An apparatus according to claim 18, wherein said first reference device is a perf detection device which detects perforations provided on the filmstrip.

20. An apparatus according to claim 17, wherein a second reference device is provided at a second predetermined distance with respect to said magnetic write head, said second reference device is disposed closely adjacent the means for writing.

21. An apparatus according to claim 10 wherein said first reference device is a first perf detection device and said second reference device is a second perf detection device.

22. An apparatus according to claim 20 wherein said first reference device is a first perf detection device and said second reference device is a second perf detection device.

23. A method for the high speed reading information/data from a photosensitive filmstrip and for writing information/data on a magnetic layer provided on said filmstrip, the method comprising the steps of:

moving the filmstrip in a single direction at a relative high rate of speed;

reading information/data from said filmstrip; writing information/data on said magnetic strip at a predetermined location spaced from said means for reading information/data; and writing information/data on said filmstrip in the area adjacent which said information/data relates.

\* \* \* \* \*